United States Patent [19]

Yamamoto

[11] Patent Number: 5,404,479
[45] Date of Patent: Apr. 4, 1995

[54] ELECTRONIC FILING APPARATUS FOR FILING AND RETRIEVING DOCUMENT DATA IN A DISK STORAGE MEDIUM

[75] Inventor: Keiji Yamamoto, Funabashi, Japan

[73] Assignee: Ricoh Company, Ltd., Tokyo, Japan

[21] Appl. No.: 790,445

[22] Filed: Nov. 12, 1991

[30] Foreign Application Priority Data

Nov. 15, 1990 [JP] Japan .................................. 2-309248

[51] Int. Cl.⁶ .......................................... G06F 13/00
[52] U.S. Cl. .................................. 395/425; 364/239.5; 364/239.51; 364/242.31; 364/920.7; 364/DIG. 1; 358/442; 358/444; 358/462; 395/116; 395/275
[58] Field of Search ............... 395/425, 700, 600, 800, 395/116; 364/401, 239.5, 239.51; 360/15; 358/442, 444, 462

[56] References Cited

U.S. PATENT DOCUMENTS

| | | | |
|---|---|---|---|
| 4,410,917 | 10/1983 | Newdoll et al. | 360/15 |
| 4,490,747 | 12/1984 | Yokoyama | 358/296 |
| 4,566,039 | 1/1986 | Oya | 358/280 |
| 4,653,021 | 3/1987 | Takagi | 395/600 |
| 5,012,407 | 4/1991 | Finn | 395/700 |
| 5,159,692 | 10/1992 | Imai et al. | 395/800 |
| 5,168,444 | 12/1992 | Cukor et al. | 364/401 |
| 5,218,685 | 6/1993 | Jones | 395/425 |
| 5,229,866 | 7/1993 | Kashiwigi et al. | 358/444 |
| 5,257,120 | 10/1993 | Hirota | 358/443 |
| 5,276,805 | 1/1994 | Hamaguchi | 395/164 |
| 5,283,667 | 2/1994 | Kojima et al. | 358/462 |

Primary Examiner—Joseph L. Dixon
Assistant Examiner—Frank J. Asta
Attorney, Agent, or Firm—Popham, Haik, Schnobrich & Kaufman, Ltd.

[57] ABSTRACT

An electronic filing apparatus for filing and retrieving document data in a disk storage medium. The apparatus includes an image reading part for scanning a document with plural pages to successively generate image data from each of the pages of the document, first and second buffer memories in which the image data generated by the image reading part is temporarily stored, a first recording part for temporarily recording the image data on a hard disk in the first recording part, a first control part for temporarily storing the image data in either the first buffer memory or the second buffer memory in proper sequence, a second recording part for recording the image data on an optical disk in the second recording part, and a second control part for recording and registering the image data on the hard disk into the optical disk at an idle time after the recording of the image data on the hard disk is completed.

7 Claims, 3 Drawing Sheets

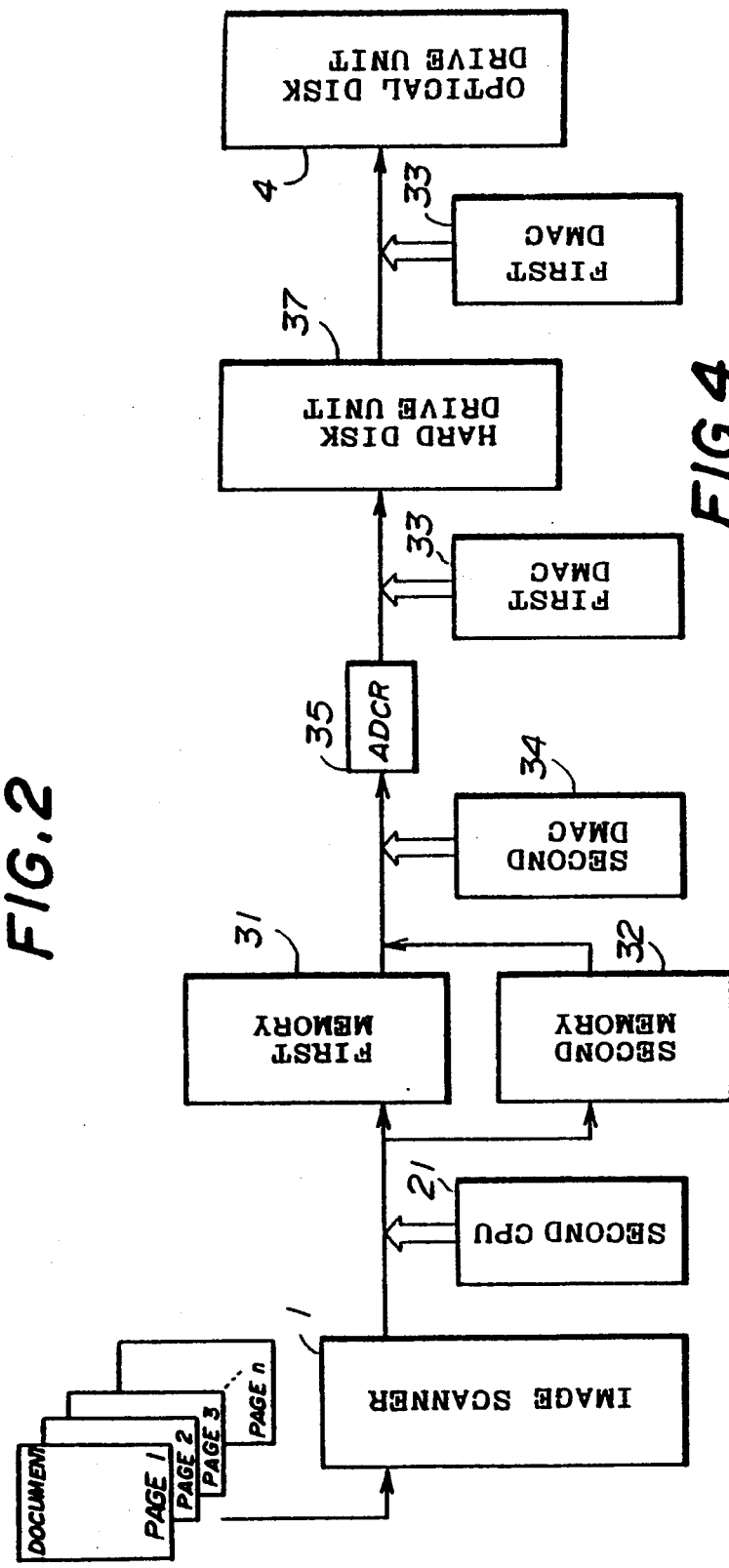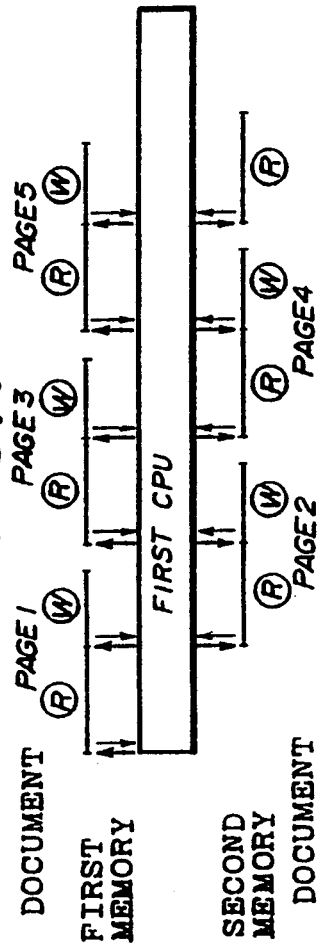

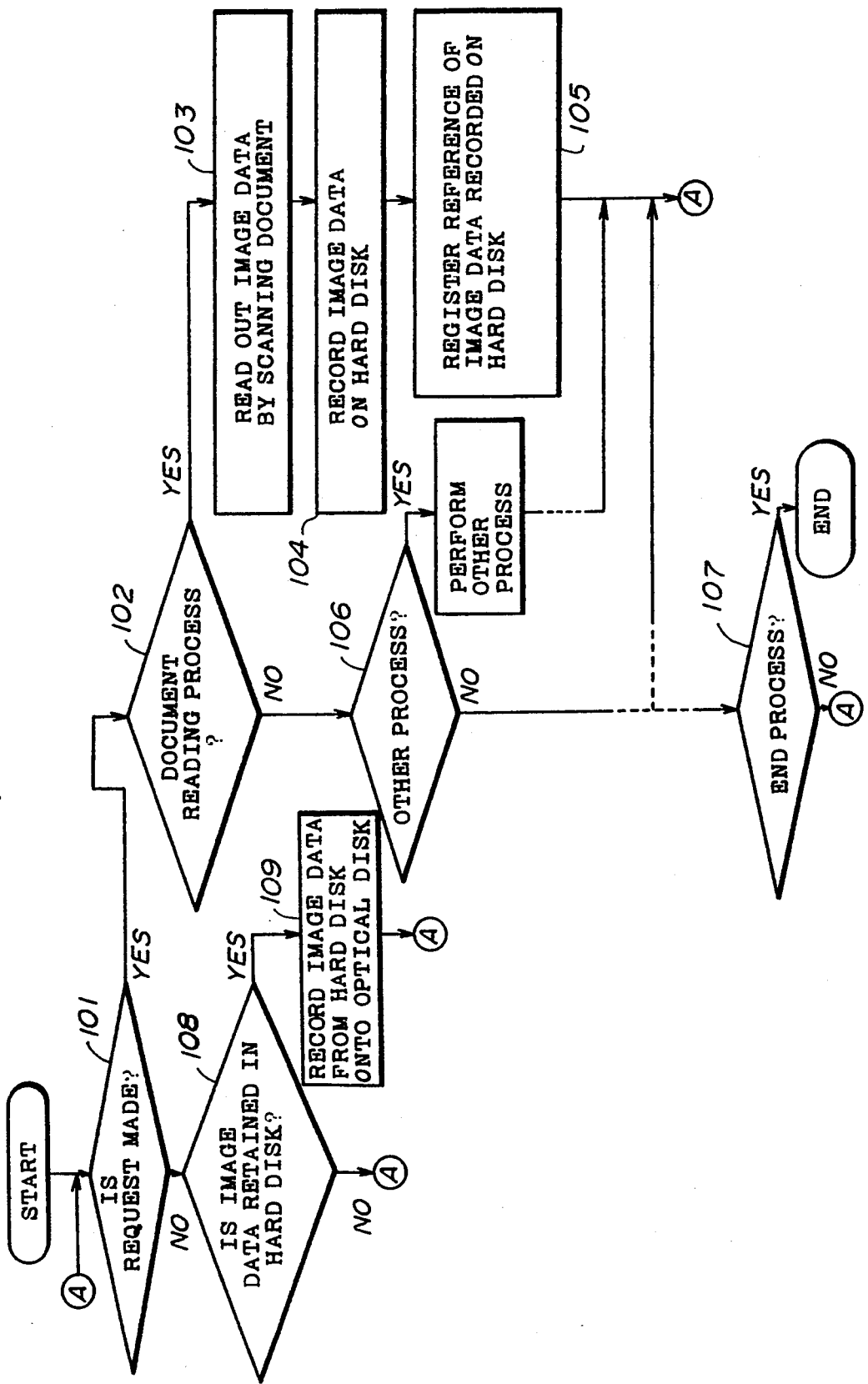

ELECTRONIC FILING APPARATUS FOR FILING AND RETRIEVING DOCUMENT DATA IN A DISK STORAGE MEDIUM

BACKGROUND OF THE INVENTION

The present invention generally relates to an electronic filing apparatus for filing document data in which image data is obtained by scanning a document and the image data is recorded and registered on an optical disk which allows for retrieval of the document data in the optical disk, and more particularly relates to the improvement for reducing processing time for recording and registering image data on an optical disk of an electronic filing apparatus of this type.

Electronic filing apparatuses constructed with a personal computer in recent years have an image reading part such as a scanner, for reading out image data by scanning a document, and an image recording part such as a disk drive unit, for recording and registering image data from the scanned document on a disk storage medium. The image data is transferred to the image recording part, and recorded on the disk storage medium which is, for example, an optical disk that is placed in an optical disk drive unit. The optical disk usually is a large-capacity storage medium.

The scanner of an electronic filing apparatus is capable of scanning a document so as to generate image data into which image signals from the scanned document are converted photoelectrically. The optical disk drive unit of the electronic filing apparatus is capable of recording on an optical disk a large quantity of image data from the scanned document. The image data recorded on the optical disk can be read out and re-recorded, by means of the optical disk drive unit, for future retrieval and registration of document data.

In a conventional electronic filing apparatus, a document with a plurality of pages is successively scanned page by page by the scanner, and the image data from each page of the scanned document is recorded on an optical disk. More specifically, image data from a first page of the document is read out by the scanner, and, after the reading out thereof is completed, the image data is recorded onto an optical disk by the optical disk drive unit. Similarly, with respect to the subsequent pages of the document, after the reading of image data from each of the pages of the document is completed, the image data is recorded on the optical disk. The optical disk is a large-capacity storage medium and is useful for retaining a large quantity of image information. However, when compared with a medium-capacity disk storage medium like a hard disk having a relatively short access time, there is a problem in that an access time for recording image data on a large-capacity disk storage medium like the optical disk is considerably long when compared with the access time in the case of such a medium-capacity disk storage medium as the hard disk. The reading out of image data by the scanner and the recording of the image data by the optical disk drive unit on the optical disk are alternately performed by the conventional electronic filing apparatus, and it takes a relatively long time to record the image data on the optical disk. For this reason, in the case of the conventional electronic filing apparatus, there is a problem in that the efficiency of document processing by the apparatus inevitably becomes worse when the image data is recorded on an optical disk.

SUMMARY OF THE INVENTION

Accordingly, it is a general object of the present invention to provide an improved electronic filing apparatus in which the above described problems of the conventional apparatus are eliminated.

Another and more specific object of the present invention is to provide an electronic filing apparatus which shortens processing time for recording image data on an optical disk for preventing lowered efficiency of the document processing by the apparatus, thus enabling fast, efficient document processing. The above mentioned objects of the present invention can be achieved by an electronic filing apparatus, for filing and retrieving document data in a disk storage medium, which includes an image reading part for scanning a document with plural pages to successively generate image data from each of the pages of the document, first and second buffer memories in which the image data generated by the image reading part is temporarily stored, the first and second buffer memories each having a storage capacity for retaining information covering at least one page of the document, a first recording part for temporarily recording the image data, transferred from the first and second buffer memories to the first recording part, on a hard disk in the first recording part, a first control part for temporarily storing the image data, generated by the image reading part, in either the first buffer memory or the second buffer memory in proper sequence by transferring the image data from the image reading part to either the first buffer memory or the second buffer memory, a second recording part for recording the image data, transferred from the hard disk to the second recording part, on an optical disk in the second recording part, and a second control part for controlling the first and second recording parts and the first control part so as to record and register the image data, recorded temporarily on the hard disk in the first recording part, on the optical disk in the second recording part at an idle time after the recording of the image data on the hard disk is completed. According to the present invention, the image data read out by the scanner by scanning a document with plural pages is temporarily recorded on a hard disk and the image data in the hard disk is finally recorded on an optical disk at an idle time of a control unit after the image data has been recorded on the hard disk. Because the time required for recording the image data on the hard disk which accounts also for the time required for reading out the image from the scanned document is considerably short, it is possible for the present invention to improve the efficiency of the electronic filing apparatus for speedy, efficient document processing. Also, according to the present invention, the reading of image data by the scanner and the temporary recording of the image data on the hard disk are simultaneously performed, thereby increasing the efficiency of the document filing process.

Other objects and further features of the present invention will be apparent from the following detailed description when read in conjunction with the accompanying drawings.

BRIEF DESCRIPTION OF THE DRAWINGS

FIG. 2 is a diagram for explaining a flow of image data when the image data is read out by a scanner and recorded in an optical disk by an optical disk drive unit;

FIG. 3 is a flow chart for explaining a major document processing routine executed each time the electronic filing apparatus is started; and FIG. 4 is a timing chart for explaining the operations of a first CPU when image data is read out by scanning a document and the image data is transferred to a hard disk drive part and recorded on a hard disk therein.

DESCRIPTION OF THE PREFERRED EMBODIMENT

Figure 1:
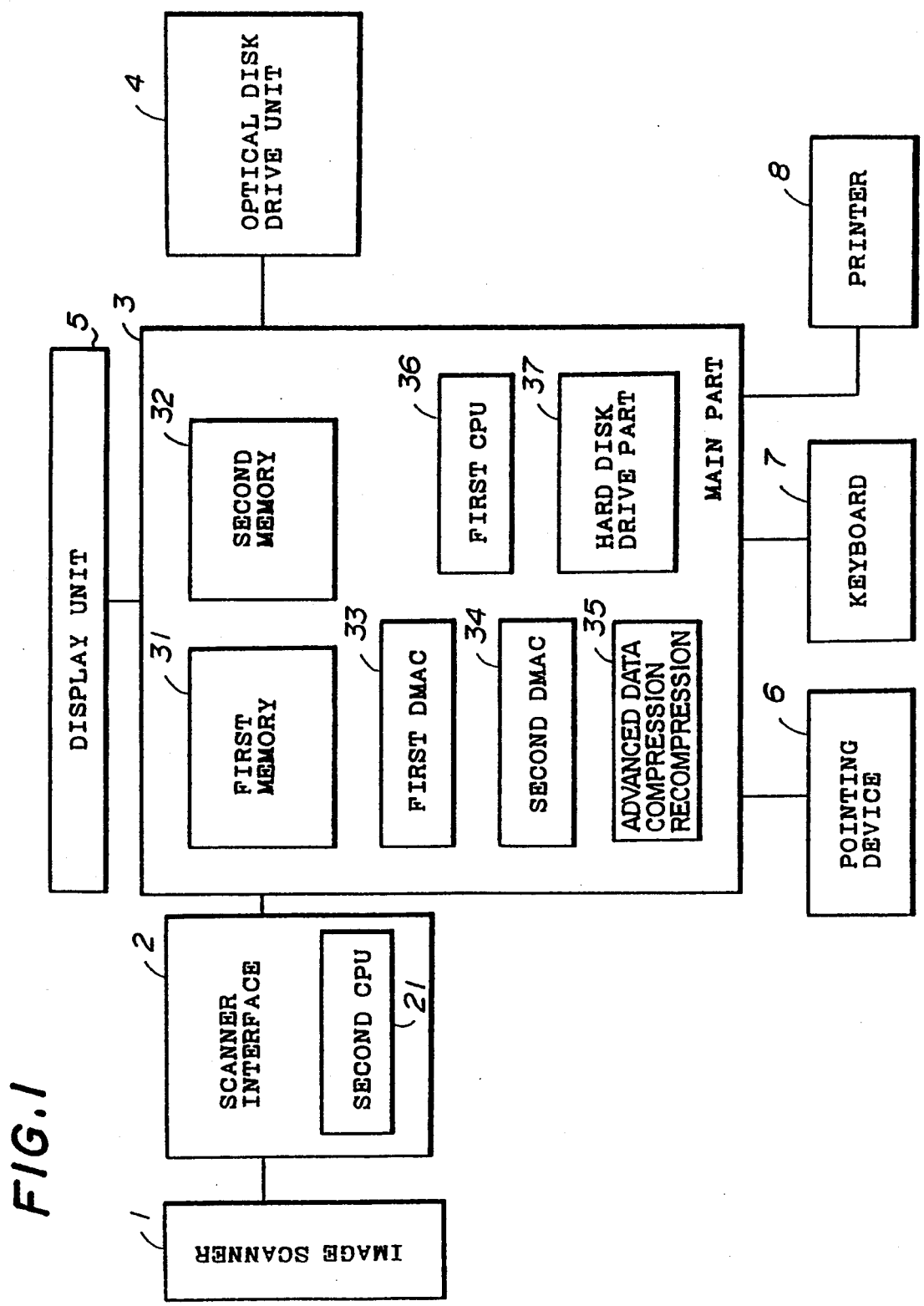
FIG. 1 is a block diagram showing a construction of an electronic filing apparatus to which the present invention may be applied.

A description will now be given of an electronic filing apparatus to which an embodiment of the present invention is applied, with reference to FIG. 1. In FIG. 1, this electronic filing apparatus includes an image scanner 1, a scanner interface board 2, a main part 3, an optical disk drive unit 4, a display unit 5, a pointing device 6, a keyboard 7 and a printer 8. The image scanner 1 reads out image data by scanning a document by means of a light beam converging thereon and photoelectrically converts a light beam reflected from the scanned document so that image signals are generated. The main part 3 of the electronic filing apparatus includes a first memory 31 having storage capacity for storing image signals corresponding to at least one page of the document (equivalent to 1 megabyte), a second memory 32 having storage capacity for storing image signals corresponding to at least one page of the document (equivalent to 1 megabyte), a first DMAC (direct memory access controller) 33, a second DMAC 34, an ADCR 35, a first CPU (central processing unit) 36, and a hard disk drive part 37.

The scanner interface board 2 which is connected to the main part 3 includes a second CPU (central processing unit) 21, and this second CPU 21 is a slave processor controlled by the first CPU 36 in the main part 3. In other words, the first CPU 36 in the main part 3, which carries out a control program stored in a memory (not shown) within the main part 3 for controlling operations of the electronic filing apparatus, is a master processor of controlling operations of the second CPU in the scanner interface board 2. The display 5, the pointing device 6, the keyboard 7 and the printer 8 are connected to and controlled by the main part 3 of the electronic filing apparatus shown in FIG. 1. With the above described construction, the electronic filing apparatus can retrieve the image data recorded and registered in an optical disk which is placed into the optical disk drive unit 4.

Both the first memory 31 and the second memory 32 provided within the main part 3 shown in FIG. 1 are buffer memories, each having storage capacity enough to retain the quantity of image information read out by the image scanner 1 (equivalent to 1 megabyte) from one page or more of a document being scanned. As described above, the first CPU 36 in the main part 3 operates as a master processor controlling the second CPU 21 in the scanner interface board 2, and this first CPU 36 carries out a control program, which is stored in a memory (not shown) in the main part 3, for controlling the operations of the electronic filing apparatus. The second CPU 21 in the scanner interface board 2 constitutes a controller which controls the transfer of image data in proper sequence from the image scanner 1 to either the first memory 31 or the second memory 32. The first DMAC 33, the second DMAC 34, the ADCR 35 and the first CPU 36, provided within the main part 3, constitute a controller that controls the recording of the image data, stored in the first memory 31 or the second memory 32, onto the hard disk in the hard disk drive 37, and the recording and registering of the image data, recorded on the hard disk, onto the optical disk in the optical disk drive unit 4.

Next, a description will be given of the flow of image data read out from a document and recorded on an optical disk by the document filing apparatus according to the present invention, with reference to FIG. 2. In the document filing apparatus, the image data is processed in the sequence shown in FIG. 2. In FIG. 2, those parts which are the same as those corresponding parts in FIG. 1 are designated by the same reference numerals, and a description thereof will be omitted.

A document with a plurality of pages, indicated by PAGE 1 to PAGE n in FIG. 2, is scanned by the image scanner 1, and image data from each page of the document (equivalent to 1 megabyte capacity) is stored alternately in the first memory 31 or the second memory 32 in proper sequence. As shown in FIG. 2, image data from the first page (PAGE 1) of the document is read out by the image scanner 1, and the image data is first transferred to the first memory 31 of the main part 3 under control of the second CPU 21 in the scanner interface board 2. Next, image data from the second page (PAGE 2) is read out by the image scanner 1 and transferred to the second memory 32 under control of the second CPU 21. Similarly, image data from each of the subsequent pages (PAGE 3 to PAGE n) is read out by the image scanner 1, and, after the preceding image data stored in the first memory 31 or the second memory 32 is transferred, the following image data from each of the subsequent pages is transferred alternately to the first memory 31 or the second memory 32 under control of the second CPU 21.

The image data stored in the first memory 31 and the second memory 32 is transferred to the ADCR 35 in the main part 3, under control of the second DMAC 34. The ADCR 35 carries out compression of the image data transferred thereto so as to produce a compressed image data. The compressed image data is transferred, from the ADCR 35 to the hard disk drive part 37 by the first DMAC 33, so that the image data is temporarily recorded on a hard disk in the hard disk drive part 37. After this, at an idle time of the first CPU 36 (at a time between operations when no work is scheduled), the recorded image data on the hard disk is transferred to the optical disk drive unit 4 by the first DMAC 33 so that the image data transferred thereto is finally recorded on an optical disk in the optical disk drive unit 4.

As described above, image data is read out successively from the document with the plurality of pages PAGE 1 to PAGE n by the image scanner 1 and transferred alternately to the first memory 31 or the second memory 32, and the image data in the first memory 31 or the second memory 32 is transferred to the hard disk drive part 37 and temporarily recorded on a hard disk in the hard disk drive part 37. The image data temporarily recorded on the hard disk is transferred to the optical disk drive unit 4 and finally recorded on an optical disk in the optical disk drive unit 4.

FIG. 3 is a flow chart for explaining a major document processing routine executed each time the electronic filing apparatus is started. In this flow chart shown in FIG. 3, a step 101 checks whether or not a request is made for document processing. This request status is checked by the first CPU 36, and pertinent document processing is carried out by the document filing apparatus in response to the request being made. If a request for document processing is made, a step 102 checks whether or not a document reading process is requested for generating image data by scanning a document with plural pages.

If a request is made for the document reading process, a step 103 is performed to read out image data by scanning a document with plural pages by means of the image scanner 1. A step 104 records the image data on a hard disk in the hard disk drive part 37, and a step 105 registers a reference number of the image data recorded on the hard disk. The procedure is returned back to the step 101 for checking again whether or not a request for document processing is made.

When it is found in the step 102 that no request is made for the document reading process, a step 106 checks whether or not the request for another process is made. Although no specific designation is shown in FIG. 3, similar checking steps may be performed at this point of the flow chart to check whether or not a request is made for any other processes. A step 107 checks whether or not a request is made for an END process. If it is found in the step 107 that an END process is requested, the procedure as shown in FIG. 3 is completed.

When it is found in the step 101 that no request for document processing is made, a step 108 is performed to check whether or not image data is already recorded on the hard disk. If it is found in the step 108 that image data is already recorded on the hard disk, a step 109 transfers the image data, recorded on the hard disk, to the optical disk drive unit 4 and records the same on an optical disk in the optical disk drive unit 4 at an idle time of the first CPU 36. If it is found that no image data is recorded on the hard disk, the procedure is returned back to the step 101 for checking again whether or not a request for document processing is made.

In the above described manner, at an idle time of the first CPU 36 after the above procedure is performed, the image data recorded on the hard disk is transferred to the optical disk drive unit 4 by the first DMAC 33 so that the image data is recorded finally on an optical disk in the optical disk drive unit 4.

FIG. 4 is a timing chart for explaining operations of the first CPU 36 when image data is read out by scanning a document by means of the image scanner 1 and the image data is transferred to the hard disk drive part 37 and recorded on a hard disk in the hard disk drive part 37 within the electronic filing apparatus according to the present invention. In FIG. 4, a character "R" indicates the time for reading out image data by scanning a document by means of the image scanner 1, and a character "W" indicates the time for recording image data on a hard disk. As described above, the first CPU 36 in the main part 3 is capable of executing a control program for performing the procedure as shown in FIG. 2.

First, the first CPU 36 instructs the second CPU 21 in the scanner interface board 2 to control the image scanner 1 so as to read out image data by scanning the first page "PAGE 1" of the document. Then, the second CPU 21 is instructed to transfer the image data, read out from the first page of the document, to the first memory 31, so that the image data is stored in the first memory 31. This document reading step, for reading out the image data from the first page and storing the same in the first memory 31, corresponds to the time indicated by a character "R" on the left-hand side of the PAGE 1 area in FIG. 4. The first CPU 36 remains in a waiting condition until the operations of the second CPU 21 are completed.

After the document reading step for the first page PAGE 1 of the document is completed, the first CPU 36 instructs the second CPU 21 to control the image scanner 1 so as to read out image data by scanning the second page "PAGE 2" of the document, and transfer the same to the second memory 32, so that the image data is stored in the second memory 32. This document reading step, for reading out the image data from the second page and storing the same in the second memory 32, corresponds to the time indicated by a character "R" on the left-hand side of the PAGE 2 area in FIG. 4.

Next, the first CPU 36 instructs the second DMAC 34, the ADCR 35 and the first DMAC 33 so as to record the image data of the first page of the document, stored in the first memory 31, on the hard disk in the hard disk drive unit 37. The first CPU 36 remains in a waiting condition until the operations of the second DMAC 34 are completed. This data recording step, for recording the image data on the hard disk, corresponds to the time indicated by a character "W" on the right-hand side of the PAGE 1 area in FIG. 4. After this data recording step is completed, the first CPU 36 instructs the second CPU 21 to control the image scanner 1 so as to read out image data from the third page "PAGE 3" of the document. The second CPU 21 is instructed so as to transfer the image data to the first memory 31, so that the image data is stored in the first memory 31. This document reading step, for the third page of the document, corresponds to the time indicated by a character "R" on the left-hand side of the PAGE 3 area in FIG. 4.

Next, the first CPU 36 instructs again the second DMAC 34, the ADCR 35 and the first DMAC 33 so as to record the image data of the second page of the document, stored in the second memory 32, on the hard disk in the hard disk drive unit 34. The first CPU 36 remains in a waiting condition until the operations of the second DMAC 34 are completed. This data recording step, for recording the image data on the hard disk, corresponds to the time indicated by a character "W" on the right-hand side of the PAGE 2 area in FIG. 4. After this data recording step is completed, the first CPU 36 instructs the second CPU 21 again to control the image scanner 1 so as to read out image data from the fourth page "PAGE 4" of the document and store the same in the first memory 31. This document reading step, for reading the fourth page of the document, corresponds to the time indicated by a character "R" on the left-hand side of the PAGE 4 area in FIG. 4.

As described in the foregoing, the electronic filing apparatus according to the present invention uses the first and second memories 31 and 32, and the image data, read out by sequentially scanning a document with plural pages, is stored alternately in proper sequence in either the first memory 31 or the second memory 32. The preceding image data stored in one of the two memories is recorded on the hard disk, while the following image data is read out from the document and stored in the other memory simultaneously. Therefore, the time actually required for the electronic filing apparatus of the present invention to perform the document processing is only the time required for scanning the document to read out image data therefrom, and thus remarkably shortens the time required for document processing.

It is to be noted that the electronic filing apparatus according to the present invention includes two memories, each having storage capacity to retain information covering at least one page of a document, and a specific-use controller for transferring the image data generated by an image scanner into either one of the two memories in proper sequence so that the image data is stored in either one of the two memories. It is also to be noted that the electronic filing apparatus includes a hard disk drive unit with a relatively short access time, in which image data transferred from the two memories is temporarily recorded on a hard disk, an optical disk drive unit with a relatively long access time, in which the image data transferred from the hard disk is finally recorded on an optical disk, and a second controller for controlling the transfer and storing of the image data temporarily recorded in the hard disk onto the optical disk at an idle time of the first CPU 36 after the image data in the two memories has been recorded on the hard disk.

Accordingly, the time for recording image data in the hard disk is considerably shorter than the time for directly recording image data on the optical disk, and the load on the electronic filing apparatus when image data is recorded on the optical disk can be reduced. It is therefore possible for the present invention to attain speedy, efficient filing and retrieval of document data in the optical disk. Also, according to the present invention, image data from a preceding page of a plural-page document, already stored in one of the two memories, is temporarily recorded on the hard disk, at the same time as image data from a following page of the document is scanned and stored in the other memory. Thus, the processing time for successive scanning of a document with plural pages and for recording image data on the hard disk is remarkably reduced, thereby attaining speedy, efficient document processing.

Further, the present invention is not limited to the above described embodiment, and variations and modifications may be made without departing from the scope of the present invention.

What is claimed is:

1. An electronic filing apparatus for filing and retrieving document data in a disk storage medium, comprising:

image reading means for scanning a document with plural pages to successively generate image data from each of the pages of the document;

first and second buffer memories in which said image data generated by the image reading means is temporarily stored, the first and second buffer memories each having a storage capacity to retain information covering at least one page of the document;

first recording means for temporarily recording the image data, transferred from said first and second buffer memories to said first recording means, on a hard disk in said first recording means;

first control means for temporarily storing the image data, generated by said image reading means, in either the first buffer memory or the second buffer memory, in proper sequence, by transferring said image data from the image reading means to either the first buffer memory or the second buffer memory;

second recording means for recording the image data, transferred from the hard disk to said second recording means, on an optical disk in said second recording means; and second control means for controlling said first and second recording means and said first control means so as to record and register the image data, recorded temporarily on the hard disk in the first recording means, onto the optical disk in said second recording means at an idle time after the recording of the image data on the hard disk is completed, wherein controlling said first control means includes transferring image data from said image reading means to one of said buffers while simultaneously transferring image data from the other of said buffers to said first recording means.

2. The apparatus as claimed in claim 1, wherein said second control means controls the first recording means and the first control means so that image data from a preceding page in said plural pages of said document, stored in one of the first and second buffer memories, is recorded on the hard disk, at the same time as image data from a following page of said document is stored in the other buffer memory.

3. The apparatus as claimed in claim 1, wherein said first control means includes a central processor for controlling the transfer of the image data, generated by the image reading means from each of the plural pages of the document, into either the first buffer memory or the second buffer memory, in proper sequence.

4. The apparatus as claimed in claim 3, wherein said central processor of said first control means is controlled by a central processor included in the second control means so that the image data, generated by the image reading means, is transferred into either the first buffer memory or the second buffer memory in proper sequence.

5. The apparatus as claimed in claim 1, wherein said second control means includes a central processor which controls transfer of the image data, temporarily stored in the first and second buffer memories, into the first recording means so that said image data is recorded on the hard disk, and controls transfer of the image data, recorded on the hard disk, into the second recording means so that said image data is recorded and registered on the optical disk at an idle time of said central processor.

6. The apparatus as claimed in claim 5, wherein said central processor of said second control means controls operations of the second recording means so that the image data recorded temporarily on the hard disk is recorded and registered on the optical disk in the second recording means only when it is verified that no request for a document reading process is made and that the image data is already recorded on the hard disk.

7. The apparatus as claimed in claim 5, wherein said central processor of said second control means checks whether or not a request for a document reading process is made, each time said apparatus is started for reading operation to read out one of the plural pages of the document. An Electronic Filing Apparatus for Filing and Retrieving Document Data in a Disk Storage Medium

* * * * *